United States Patent

Teurnier et al.

[15] 3,644,672

[45] Feb. 22, 1972

[54] LINE EQUIPMENT DEVICE FOR TELEGRAPH LINES

[72] Inventors: Roger Teurnier, Rueil-Malmaison; Claude Rousseau, Joinville-le-Pont, both of France

[73] Assignee: C. I. T.-Compagnie Industrielle Des Telecommunications, Paris, France

[22] Filed: Mar. 19, 1969

[21] Appl. No.: 808,409

[30] Foreign Application Priority Data

Mar. 19, 1968 France ....................................144398

[52] U.S. Cl. ................................................178/69 G, 178/2

[51] Int. Cl. ........................................................H04l 25/02

[58] Field of Search ............................................178/2, 69 G

[56] References Cited

UNITED STATES PATENTS 3,251,929 5/1966 Kafitz ........................................178/2

*Primary Examiner*—Kathleen H. Claffy

*Assistant Examiner*—Douglas W. Olms

*Attorney*—Sughrue, Rothwell, Mion, Zinn & Macpeak

[57] ABSTRACT

The line equipment device comprises a first transistor circuit connected in parallel with the said line, controlling the currents flowing along line wires A and B, a second transistor circuit detecting the polarity of the said line wire, a third transistor circuit connected to the second circuit, causing a delay in the transmission of the state of a line wire, a fourth transistor circuit connected to the first circuit indicating to selecting devices the state of readiness for operation or occupancy of the line equipment, and a fifth transistor circuit connected to the fourth circuit for use in case of line outings.

10 Claims, 1 Drawing Figure

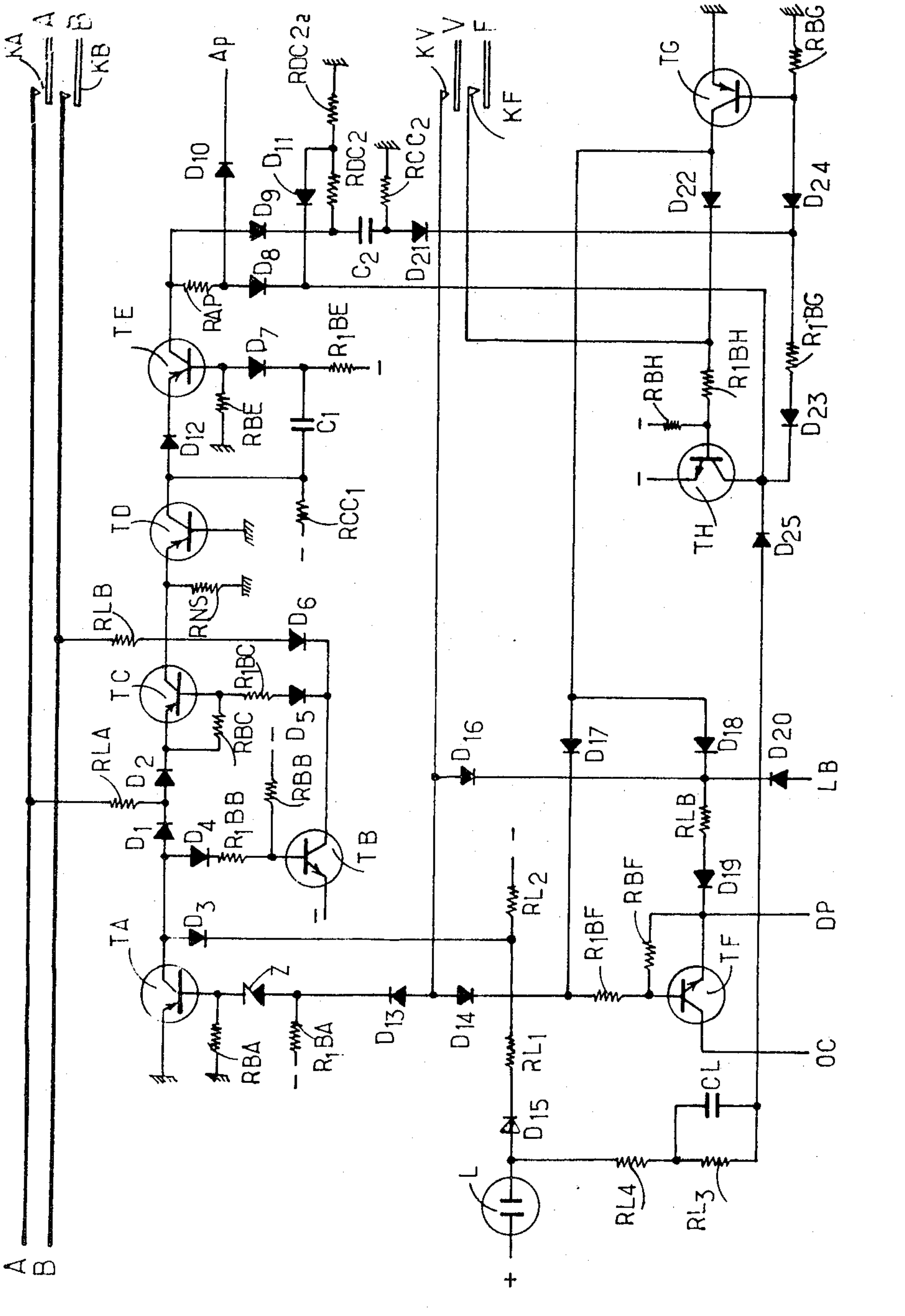

LINE EQUIPMENT DEVICE FOR TELEGRAPH LINES

BACKGROUND OF THE INVENTION

1. Field of the Invention

The invention relates to an electronic line equipment arrangement, notably for a telegraph line.

The object of the invention is to provide a subscriber's line with equipment which consists entirely of semiconductor elements which may be employed in automatic telegraphic switching equipment.

The line equipment according to the invention is suitable more particularly in the case of a semielectronic automatic telegraphic switch which utilizes electromagnetic crossbar switches only for the points of connection of the communication.

2. Prior Art

It is known that telegraph lines are traversed by alternately positive and negative currents. The use of semiconductors connected in the line wires is therefore difficult especially when it is desired to make an interruption. The arrangement proposed in accordance with the invention is branched off from the line and has very high impedance in the conversation position both for positive voltages and for negative voltages of the line. When it is desired to cut the line, for example in the case of blocking for isolating the remainder of the automatic switching equipment, this cut is made by means of the crossbar switch situated between the line equipment and the continuation of the selecting network.

SUMMARY OF THE INVENTION

The line equipment arrangement according to the invention comprises a first transistor circuit branched off from the line and controlling the currents along the line wires A and B, a second transistor circuit branched off from a line wire and detecting the polarities of the said line wire, a third transistor circuit connected to the second circuit and introducing a delay into the transmission of the state of a line wire to those members of the installation which are concerned, in order to avoid false calls on transient signals, a fourth transistor circuit connected to the first circuit and indicating to selecting members the "free" or "busy" state of the line equipment, and a fifth transistor circuit connected to the fourth circuit and employed in the case of incidents along the line.

The arrangement according to the invention performs the functions of a conventional line equipment, i.e.:

a. the call set up by a caller by means of a change of polarity in the line is retransmitted to the selecting members in a form in which it can be utilized by the latter, b. the state of availability of a called subscriber is indicated to the selecting members and the transfer of the availability marking to another line is effected in the case of busy grouped lines, c. in the case of incidents along the line, such as nonreturn of positive polarity, nonreturn of the answer-back code, or permanent loop, the line is blocked and isolated from the installation, d. a blocked line is released by a positive polarity followed by a negative polarity at the wire A, after suppression of the positive polarity in the case of a permanent loop.

In accordance with one feature of the invention, precautions are taken to ensure that the call or the unblocking is effective only for line signals different from the spurious signals.

In accordance with another feature of the invention, the arrangement comprises eight transistors, two of which operate at the quiescent currents of the line. Another transistor indicates to the selecting members the availability of the arrangement. Two transistors detect the polarities of the wire A; one transistor introduces a delay into the transmission of the state of the wire A. Finally, two transistors are employed in the case of blocking.

In accordance with another feature of the arrangement of the invention, the signalling received from the line wires is retransmitted to the members concerned in the central office only with some delay, which is such that the transient signals of shorter durations than the delay are not retransmitted.

Another feature of the arrangement according to the invention resides in the busy test of the grouped lines, which permits of determining the first available line among the grouped lines by means of a connection between the "busy" wire of the $n$th line to the "free" wire of the $(n+1)$th line.

One advantage of the arrangement according to the invention resides in the fact that it is of smaller overall dimensions than its electromagnetic equivalent.

Another advantage of the arrangement according to the invention is that it can operate with line currents which are lower than those necessary in equipment of conventional type, so that the length of the lines may be increased without any repeater being required.

Finally, another advantage of the arrangement according to the invention resides in its static form, which simplifies maintenance by eliminating wear and adjustment, and which consequently increases the reliability of the central office.

BRIEF DESCRIPTION OF THE DRAWING

Further advantages and features of the invention may become apparent from the detailed description given in the following with reference to the FIGURE of the accompanying drawing, which illustrates by way of nonlimiting example one form of construction of an arrangement according to the invention.

DETAILED DESCRIPTION OF THE INVENTION

In the form of construction illustrated in the FIGURE, the two wires A and B of the telegraph line may be isolated from the automatic switching equipment by normal contacts KA and KB of a crossbar switch (not shown) which comprises on the one hand a contact KV in the wire holding the line equipment in the service condition, and a contact KF in the fault wire F which places the equipment out of service.

The wire A is branched from the line through a resistor RLA to the common point between two diodes $D_1$, $D_2$ connected together from the cathode of $D_1$ to the anode of $D_2$. The cathode of $D_2$ is connected on the one hand to the emitter of a transistor TC of PNP type and on the other hand to the base of the same transistor through a resistor RBC.

The wire B is branched from the line through a resistor RLB in series with a diode $D_6$ in the anode-cathode direction, the cathode of the diode $D_6$ being connected on the one hand to the base of the transistor TC through a diode $D_5$ and a resistor R1BC in series, the diode $D_5$ being taken in the cathode-anode direction, and on the other hand, to the collector of a transistor TB of NPN type, the emitter of the latter being connected to the negative pole of the telegraph source, the midpoint of which is grounded.

The anode of the diode $D_1$ is connected on the one hand to the collector of a transistor TA of PNP type, the emitter of which is grounded, and on the other hand to the base of the transistor TB through a diode $D_4$ and a resistor R1BB, the diode being taken in the anode-cathode direction. The base of the transistor TB is also connected to the negative polarity through a resistor RBB.

The base of the transistor TA is connected to the base of a transistor TF of NPN type through the following members in series: a Zener diode Z taken in the cathode-anode direction, a diode $D_{13}$ taken in the cathode-anode direction, a diode $D_{14}$ taken in the anode-cathode direction and a resistor R1BF.

A resistor RBA, of which one end is grounded, has its other end connected to the base of the transistor TA.

A resistor R1BA of which one end is connected to the negative polarity has its other end connected to the anode of the Zener diode Z.

The point common to the two diodes $D_{13}$ and $D_{14}$ is connected to the off-normal contact KV of the wire V of the crossbar switch. The point common to the cathode of the diode $D_{14}$ and to the resistor R1BF is connected through a diode $D_{17}$, taken in the cathode-anode direction, to the collector of a transistor TG of PNP type, the emitter of which is grounded. Finally, the base of the transistor TF is connected to the emitter of the same transistor through a resistor RBF.

The collector of the transistor TC is connected to the emitter of a transistor TD, this emitter also being connected to ground through a resistor RNS. The base of the transistor TD, which is of PNP type, is directly connected to ground. The collector of the transistor TD is connected on the one hand through a diode $D_{12}$ taken in the anode-cathode direction to the emitter of a transistor TE of PNP type and on the other hand to the point common to a resistor RCC1 and to one of the electrodes of a capacitor C1; the other end of the resistor RCC1 is connected to negative polarity, while the other electrode of the capacitor C1 is connected to the point common to the cathode of a diode $D_7$ and to one end of a resistor R1BE. The base of the transistor TE is connected on the one hand to ground through a resistor RBE and on the other hand to negative polarity through the diode $D_7$ taken in the anode-cathode direction and through the resistor R1BE. The collector of the transistor TE is connected on the one hand to the collector of a transistor TH through a resistor RAP and a diode $D_8$ taken in the anode-cathode direction and on the other hand to the electrode of a capacitor C2 through a diode $D_9$ taken in the anode-cathode direction. A diode $D_{10}$ is connected in the anode-cathode direction into the call-signalling wire AP, which is branched from the common point between the resistor RAP and the anode of the diode $D_8$. Connected to the point common to the cathode of the diode $D_9$ and to one of the electrodes of the capacitor C2 is one end of a resistor RDC2, the other end of which is connected on the one hand to ground through a resistor RDC2*a* and on the other hand to the cathode of the diode $D_8$ through a diode $D_{11}$ taken in the anode-cathode direction. The second electrode of the capacitor C2 is connected on the one hand to ground through a resistor RCC2 and on the other hand to the anode of a diode $D_{21}$. The cathode of the diode $D_{21}$ is connected on the one hand to the collector of the transistor TH through a resistor R1BG and a diode $D_{23}$ taken in the anode-cathode direction, and on the other hand to the base of the transistor TG through a diode $D_{24}$ taken in the cathode-anode direction. The base of the transistor TG is also connected to ground through a resistor RBG.

A neon lamp L has one of its terminals connected to the positive pole of the battery (positive in relation to ground), its other terminal being connected to a point common to two circuits; the first circuit comprises a diode $D_{15}$ in series with resistors RL1 and RL2 the other end of the resistor RL2 being connected to the negative pole; the second circuit comprises a resistor RL4 in series with a resistor RL3, the latter being shunted by a capacitor CL, and a diode $D_{25}$ taken in the anode-cathode direction, of which the anode is connected to the collector of the transistor TH.

The point common to the two resistors RL1 and RL2 is connected to the collector of the transistor TA through a diode $D_3$ taken in the cathode-anode direction.

The collector of the transistor TF constitutes the "busy" wire OC of the line and the wire DP connected to the emitter of the transistor TF constitutes the "free" wire.

The anode of the diode $D_{17}$ is also connected to the emitter of the transistor TF through a diode $D_{18}$, a resistor RLB and a diode $D_{19}$, the two diodes $D_{18}$ and $D_{19}$ being taken in the anode-cathode direction. The point common to the resistor RLB and to the cathode of the diode $D_{18}$ is connected on the one hand through a diode $D_{16}$ taken in the cathode-anode direction to the off-normal contact KV of the wire V of the crossbar switch, and on the other hand to the output wire LB confirming the free state of the equipment, through a diode $D_{20}$ taken in the cathode-anode direction.

The base of the transistor TH is connected on the one hand to negative polarity through a resistor RBH and on the other hand to the collector of the transistor TG through a resistor R1BH and a diode $D_{22}$ taken in the cathode-anode direction.

The point common to the resistor R1BH and to the cathode of the diode $D_{22}$ is connected to the off-normal contact KF of the wire F of the crossbar switch.

The arrangement just described operates as follows:

In the inoperative state, the wire A is at negative polarity and the wire B at ground potential. These polarities produce the following conditions.

The transistors TA, TB and TC are conducting, all the others being nonconducting. The transistor TA is conducting owing to the fact that its base voltage, which depends upon the resistors RBA and R1BA, is negative in relation to the ground potential of its emitter.

Since the base potential of the transistor TB depends upon the resistors RBB and R1BB, the latter resistor receiving ground potential through the transistor TA, which is conducting, and the diode $D_4$, it is positive in relation to the negative polarity of the emitter of the transistor TB. The transistor TB of NPN type is therefore conducting.

The conducting transistor TA brings ground potential through the diodes $D_1$ and $D_2$ to the emitter of the transistor TC, while on the other hand the conducting transistor TB applies negative polarity through the diode $D_5$. The base potential of the transistor TC, which depends upon the resistors R1BC and RBC, is in any case negative in relation to the potential of the emitter of the transistor TC. The transistor TC is therefore conducting.

The potential of the emitter of the transistor TD depends upon the ground potential applied through the resistor RNS and upon the potential presented by the following circuit; ground potential through TA, $D_1$, $D_2$ and TC with the resistor R1BC branched therefrom, the diode $D_5$ and negative polarity through the transistor TB. The potential of the emitter of the transistor TD is is therefore negative in relation to ground and consequently the transistor TD is nonconducting. Hence, the transistor TE is necessarily nonconducting, its emitter not being biased.

The transistor TF is nonconducting since neither its emitter nor its base is biased. The transistor TH is not conducting, its emitter and its base being biased at the same negative voltage. The transistor TG is not conducting, its emitter and its base being biased at the same ground potential.

The capacitor C1 is charged, in the inoperative condition, between negative polarity through the resistor RCC1 and ground potential through the resistor RBE and the diode $D_7$. The capacitor C2 is discharged, its two electrodes being connected to the same ground potential, one through the resistor RCC2 and the other through the resistors RDC2 and RDC2*a*.

The neon lamp L is extinguished, the voltage across its terminals between positive polarity and ground potential, applied through the transistor TA and the diode $D_3$, being insufficient to fire it. The negative polarity coming from the line connected to the wire A passes through the resistor RLA, the diode $D_1$, the transistor TA and ground. The ground potential coming from the line connected to the wire B passes to the negative polarity through the resistor RLB, the diode $D_6$ and the transistor TB.

It will now be assumed that the line is being called by a calling subscriber. In this case, the negative polarity at the wire A is replaced by a positive polarity in relation to ground, which passes through the resistor RLA, the diode $D_2$, the transistor TC, the resistor RNS and ground. The transistor TC continues to be conducting, but the potential of its emitter having increased and having become positive in relation to ground, it follows that the emitter of the transistor TD acquires substantially the same potential and that the transistor TD becomes conducting. The potential close to ground potential, due to the branching off of the base of the transistor TD, which then appears at the collector of TD, has the effect of producing a voltage shift of the capacitor C1. The latter, which was initially charged by the negative polarity at its left-hand terminal and by ground potential at its right-hand terminal receives ground potential at its left-hand terminal and a positive voltage at its right-hand terminal. This positive voltage renders the diode $D_7$ nonconducting and at the same time blocks the base current of the transistor TE as long as the discharge of the capacitor C1 through the resistor R1BE continues. At the end of the discharge of the capacitor C1, the base current will be established in the transistor TE by the negative polarity, resistor R1BE, diode $D_7$, base-emitter junction of TE, diode $D_{12}$ and ground potential of the collector of the transistor TD and of the resistor R1BE. The transistor TE therefore becomes conducting with a delay depending upon the time constant of the discharge of the capacitor C1. This delay makes it possible to avoid calling the device by transient line pulses due, for example, to parasitic voltages. The call is signaled to the members concerned in the installation by a ground potential through the resistor RAP and the diode $D_{10}$ at the wire Ap.

When the call is serviced by the installation, a ground potential appears at the wire V (the points of connection of the crossbar switch then being established), which has the effect of bringing the voltage across the terminals of the Zener diode Z to a very low value through the diode $D_{13}$. The Zener diode is rendered nonconducting and the base current of the transistor TA having been suppressed, TA becomes nonconducting. This renders nonconducting the transistors TB, TC, TD and TE, all of which are rendered conducting one by the other. The call is suppressed at the wire Ap. The line wires extend through KA and KB to other members of the installation, and there are present in the line equipment only branch connections through very high inverse resistances of diodes or transistors. The ground potential of the wire V, through the diode $D_{16}$, renders nonconducting the diode $D_{20}$ connected into the wire LB which is used to test the availability of the line equipment when it is "called." On the other hand, since the transistor TA is nonconducting, the ground potential which is applied through the diode $D_3$ to the point common to the resistors RL1 and RL2 is removed. The neon lamp L is lit up between the positive and negative polarities through $D_{15}$, RL1 and RL2.

The line equipment whose operation has just been described when seized by a caller, may obviously also be seized by a "called subscriber." Its operation in the latter case will be described.

When the selecting members designate a called line equipment with which a communication is to be established, they apply a negative polarity to the wire DP. If the equipment is free, i.e., if there is no ground potential at the wire V, the negative polarity applied to the wire DP appears at the wire LB through $D_{19}$, RLB and $D_2$. On the other hand, if the equipment is busy, the ground potential of the wire V passes through the diode $D_{16}$ and renders the diode $D_{20}$ nonconducting. Since the transistor TF has a negative polarity at its emitter through DP and the ground potential at V as its base through $D_{14}$ and R1BF, it becomes conducting, and a negative "busy" polarity appears at the wire OC.

If there are a number of grouped lines, the wire DP of the first line is employed as just indicated, but the wire OC of the first line is connected to the wire DP of the second line, the wire OC of the second line is connected to the wire DP of the third line, and so on, and the wire OC of the last line is connected to the "busy" circuit. Thus, the call is sent from line to line until the first available line is reached. Any number of lines may be connected in this way, since, for each busy line, the resistance of the circuit is increased only by that of a transistor TF in the conducting state; this resistance is very low and in any case negligible as compared with the resistor RLB. If the line equipment tested is free, ground potential appears at the wire V when it is effectively seized. Likewise, in the calling case, this ground potential through $D_{13}$ successively renders nonconducting the transistors TA, TB and TC. The neon lamp L lights up by the procedure already described.

Besides the first two normal cases of operation which have just been explained, various special cases of operation will be referred to.

First, consider the case where the line equipment is blocked by nonreturn of positive polarity to the wire A. When a line equipment is used as called equipment, the call consists in applying a positive polarity to the wire B; the confirmation that the call has in fact been received is given by the change from negative polarity to positive polarity at the wire A. If this confirmation does not take place, there is a disturbance in the line, which should be placed out of service. It will be assumed that this is the case. A ground potential coming from the selecting members appears at the wire F and the closed contact KF of the crossbar switch. The transistor TH becomes conducting, its base assuming a potential higher than that of its emitter. The circuit comprising negative polarity, transistor TH, $D_{23}$, R1BG, $D_{24}$, RBG and ground is closed. The base of the transistor TG becomes negative in relation to the emitter, and the transistor TG thus becomes conducting. Through TG in the conducting state, a ground potential is applied through $D_{22}$ to the end of R1BH. The transistor TH is thus maintained in the conducting state independently of the wire F. The busying of the equipment from the collector of the transistor TG through the diodes $D_{17}$ and $D_{18}$ is analogous to the busying which was effected by the wire V through the diodes $D_{14}$ and $D_{16}$. The negative polarity through the transistor TH, $D_{25}$, RL3, shunted by CL, RL4 and the right-hand terminal of the neon lamp L sets the neon lamp in flashing operation in accordance with the known principle of the relaxation oscillator. On appearance of negative polarity, the capacitor CL is discharged and the voltage across the terminals of the lamp is sufficient to light it up. Then, the resistance of the lamp becomes low and the capacitor CL is charged through RL4. AS the capacitor becomes charged, the voltage across the terminals of the lamp decreases until it reaches the extinguishing value. When the lamp is extinguished, its resistance again becomes very high, the circuit is substantially broken and the capacitor CL discharges through the resistor RL3. When the voltage across the terminals of the capacitor CL has decreased by a value such that the voltage across the terminals of the lamp again reaches the ignition value, the lamp is lit up and the cycle recommences. The capacitor C2 is charged through the circuit comprising negative polarity, transistor TH, diode $D_{11}$, RDC2, capacitor C2, RCC2 and ground. The resistor RDC2*a* prevents the charging of C2 through the inverse resistance of the transistor TH when the latter is nonconducting. The transistors TA, TB and TC remain conducting and maintain the polarities at the line through RLA and RLB. The connection to the remainder of the installation is broken by the disconnection of the crossbar switch situated between the line equipment and the remainder of the selecting network. The wire A being either at negative polarity or without polarity, the transistors TD and TE are nonconducting. This situation continues as long as there is no change of the wire A in the state of the line. Only a change to positive polarity for some duration can unblock the line equipment, this positive polarity being sent either by the subscriber connected to the line or by an operator who cuts in upstream of the line equipment. The transistors TD and TE become conducting by the process already described with reference to the calling condition. The ground potential through the transistors TD and TE in the conducting state and the diode $D_9$ produces the discharge of the capacitor C2. A positive voltage appears at the lower terminal of the capacitor C2, which has the effect of rendering nonconducting the diode $D_{24}$ and therefore of cutting off the base current of the transistor TG. The latter becomes nonconducting and renders nonconducting the transistor TH, to which it supplies its base current. All the circuits controlled by the transistors TH and TG return to their initial position.

In the case where the line equipment is blocked in the permanent loop condition, i.e., when a line equipment is in the calling condition and, the call having been serviced, the line emits no signal, it is desirable for it to be placed out of service.

A ground potential coming from the selecting members to the wire F produces an operation similar to that of the first case of blocking. The only difference is that the wire A remains at positive polarity and the transistors TD and TE remain conducting. The negative polarity through the transistor TH and the diode $D_8$ renders nonconducting the diode $D_{10}$, whereby the call is suppressed at the wire Ap. The ground potential coming from the collector of the transistor TE through the diode $D_9$ prevents charging of the capacitor C2. The whole line equipment is maintained in this blocked condition as long as positive polarity remains on the wire A. When the latter again becomes negative, the transistors TD and TE become nonconducting and the capacitor C2 is charged, the equipment remaining blocked.

In order to unblock it, will again be necessary to have in the line a positive polarity on the wire A, which has the same origin and produces the effects already described in the foregoing with reference to the first case of blocking.

When a line is in the blocked state due to a permanent positive polarity on the wire A, as is the case here, interruptions of this positive polarity or of the transient negative polarities of spurious origin on the line do not change the blocked condition of the line equipment as long as they do not reach a certain value. These disturbances have the effect of rendering nonconducting the transistors TD and TE, but they are of insufficient duration for the capacitor C1 to be sufficiently charged through the resistor RCC1 of high value, so as to delay the turning on of the transistor TE when the transistor TD becomes conducting.

Likewise, when the transistor TE is rendered nonconducting by a spurious signal in the line, the capacitor C2 has not sufficient time to become charged sufficiently through the resistor RCC2 of high value, and when the transistor TE again becomes conducting the positive voltage sent by the capacitor C2 to the base circuit of the transistor TG is of insufficient value to tender the latter nonconducting.

Obviously, the choice of the transistors of NPN type and of PNP type may be reversed without departing from the scope of the invention, it then being sufficient to reverse the polarities of these transistors and to adapt the orientation of the diodes concerned.

Of course, the invention is in no way limited to the embodiment described and illustrated, which has been referred to only by way of example. More particularly, modifications may be made in details, certain features may be changed and certain means may be replaced by equivalent means without departing from the scope of the invention.

What is claimed is:

1. An electronic line equipment device for use in a telegraph line wherein said device connects subscribers' line to selecting members of a semielectronic automatic switching installation is a central office wherein said device permits seizure of the line by a calling party and a called party and wherein said device blocks the line upon occurrence of faults, said device comprising a first transistor circuit branched off from the line and controlling the current along the line, a second transistor circuit branched off from the line and detecting the polarities of said line, a third transistor circuit connected to the second circuit and introducing a predetermined delay in the transmission of the polarity of the line to said selecting members of the installation in order to avoid false calls in response to transient signals, a fourth transistor circuit connected to the first circuit and indicating to said selecting members the free or busy state of the line equipment, and a fifth transistor circuit connected to the fourth circuit, said fifth circuit operating in the case of faults in the line.

2. The device according to claim 1, wherein the first circuit comprises first and second transistors, the second circuit comprises third and fourth transistors, the third circuit comprises a fifth transistor, the fourth circuit comprises a sixth transistor and the fifth circuit comprises a seventh and eighth transistor, the currents along the line being controlled by the first and second transistors, the first transistor of PNP type controlling a first wire of said line and the second transistor of NPN type controlling a second wire of said line, the third and fourth transistors, both of PNP type, detecting the polarities entering the first wire, the fifth transistor of PNP type introducing the predetermined delay into the transmission of the polarity of the first wire to the members of the installation, the sixth transistor of NPN type indicating to the selecting members the free or busy state of the line equipment, the seventh transistor of PNP type and the eighth transistor of NPN type being used in the event of faults in the line, a neon lamp constantly indicating the state of the line equipment, the circuits being such that, in the rest state, only the first, second and third transistors are conducting, and when the calling party seizes the line the fourth and fifth transistors also become conducting and communicate the call to the members of the installation, the call being connected by the members of the installation, the first, second, third, fourth and fifth transistors become nonconducting and the neon lamp is lit up, and when the called party seizes the line the sixth transistor becomes conducting if the equipment is busy, but remains nonconducting if the equipment is free, and, when the call is connected, the first, second and third transistors become nonconducting, the neon lamp being lit up, so that, when a call is being effectively connected for conversation with both calling party and called party seizing the line device remains connected to the line only through very high impedances, while when a call is being blocked as a result of faults in the line the seventh and eighth transistors become conducting, the neon lamp flashes and the device cut off from the installation remains connected to the line either with the first three transistors or with the first five transistors in the conducting state until the faults causing the blocking have disappeared.

3. The device according to claim 2, wherein the first wire is connected to the collector of the first transistor and to the emitter of the third transistor, each connection taking place through a diode, the second wire being connected to the collector of the second transistor, the collector of the second transistor also being connected to the base of the third transistor, each of these connections taking place through a diode, the collector of the first transistor also being connected through a diode to the base of the second transistor, the rest state of the line being signified by a negative polarity on the first wire and by a ground potential on the second wire, the first transistor being conducting and thus rendering conducting the second transistor, and the first and second transistors being conducting and in turn rendering conducting the third transistor, the rest state of the device being characterized by the conducting state of the first, second and third transistors and by the nonconducting state of the other five transistors.

4. The device according to claim 3, wherein the emitter of the fourth transistor is connected to the collector of the third transistor and to ground through a resistor, the base of the fourth transistor being directly connected to ground, the collector of the fourth transistor being connected to the emitter of the fifth transistor through a diode and to the base of the fifth transistor through a capacitor and a diode, each of the electrodes of the capacitor also being connected to the negative polarity through a resistor, the collector of the fifth transistor being connected through a diode to a calling wire of members of said installation so that, when the line is brought into a calling state by a positive polarity on the first wire, the fourth transistor becoming conducting and producing a shift of the potentials at the electrodes of the capacitor, and the fifth transistor is temporarily rendered nonconducting as long as the discharge of the capacitor continues, the fifth transistor thereafter becoming conducting and transmitting the call to the members, the delay thus produced in the transmission permitting avoidance of false call notifications in response to transient signals.

5. The device according to claim 4, wherein when the call is connected by the members of said installation in the central office, a ground potential on a wire for holding the connection of the equipment, said ground potential emanating from a crossbar switch, and having the effect of blocking the current of the first transistor by short circuiting of a Zener diode in series with its base, the first transistor becoming nonconducting and rendering nonconducting the second, third, fourth and fifth transistors, the nonconducting state of the first transistor also causing the neon lamp to light up, so that in the busy state, the connections to the line then being made only through nonconducting transistors or diodes, the device thereby being connected to the line with a very high impedance.

6. The device according to claim 5, wherein seizure of the line by the called party is detected by an availability test on the line equipment by means of a negative polarity applied to a free wire by the selecting members, said free wire being connected to the emitter of the sixth transistor, the emitter being connected to the base of the said transistor through a resistor and to a common point which is in turn connected to the wire for holding the connection line equipment and extending from the crossbar switch through a diode, and to an availability-confirming wire through a diode, the base of the sixth transistor also being connected to the wire for holding the line equipment connected, through a resistor and a diode, and the collector of the sixth transistor being connected to a busy wire which is in turn connected to a busy circuit, the result of the test being given by the availability-confirming and holding wires so that the busy state of the line equipment at the time of the test is translated by a ground potential on the holding wire coming from the crossbar switch, and the sixth transistor then becomes conducting and applies a negative polarity to the busy wire, thus signalling the said busy state, and the free state of the line equipment at the time of the test being given by a negative polarity on the availability-confirming wire, its consecutive busying when it is connected is also manifested by a ground potential on the holding wire, with the result that the sixth transistor is rendered conducting, the first, second and third transistors are rendered nonconducting and the neon lamp is lit up.

7. The device according to claim 6, further comprising a number of grouped lines each having a device wherein seizure of one of the lines by the called party is manifested by an availability test on the line equipment by means of a negative polarity applied to the free wire of a first line of said number, the busy wire of the first line being connected to the free wire of the second line, the busy wire of the second line being connected to the free wire of the *n*th line and the busy wire of the last of said number being connected to the busy circuit, the availability-confirming wire of each device of each wire of the grouped line being connected to selecting members, so that the call is sent from line to line until the first of the available lines is reached and it being possible for any number of grouped lines to be thus connected, the total resistance of the busy circuit being increased only by the internal resistance of a transistor in the conducting state for each busy line equipment, and an available equipment having been reached, its subsequent busying when it is connected is manifested by the fact that its sixth transistor becomes conducting, its first, second and third transistors becoming nonconducting and the neon lamp being lit up.

8. The device according to claim 7, wherein in the case of blocking when the line is seized by called party due to nonreturn of the positive polarity on the first wire after the normal transmission of a call by a positive polarity on the second wire, a ground potential appears on a fault wire of the crossbar switch connected to the base of the eighth transistor, said eighth transistor becoming conducting and rendering conducting the seventh transistor, which is then maintained conducting independently of the fault wire and said fault wire applying a ground potential through a diode, to the base of the sixth transistor and to the availability-confirming wire in order to give the busying of the line equipment in the case of a test, the collector of the eighth transistor being connected through a relaxation circuit to the neon lamp, which flashes as long as this blocking state lasts, the collector of the eighth transistor also being connected through a diode to a capacitor which becomes charged, the negative polarity still being on the first wire, the first, second and third transistors are conducting and this situation is maintained until a return of the positive polarity on the first wire producing the unblocking, the fourth and fifth transistors then becoming conducting and causing the discharge of the capacitor and a shift of the potentials at its electrodes, a positive voltage then rendering nonconducting the diode through which the base current of the seventh transistor was flowing, the latter being nonconducting and thus rendering nonconducting the eighth transistor, whose base no longer receives the ground potential, and when the call is connected by the members of the installation, the ground potential on the holding wire extending from the crossbar switch renders nonconducting the first five transistors and causes the neon lamp to be continuously lit up.

9. The device according to claim 8, wherein in the case of a permanent loop blocking, the first wire remaining at positive polarity although the call has been connected, a ground potential then appears on the fault wire of the crossbar switch connected to the base of the eighth transistor, the said transistor becoming conducting and rendering conducting the seventh transistor, which is then maintained conducting independently of the fault wire and the fault wire applying a ground potential through a diode to the base of the sixth transistor and to the availability-confirming wire in order to give the busying of the line equipment in the case of a test, the collector of the eighth transistor being connected through a relaxation circuit to the neon lamp, which flashes as long as this blocked state lasts, the first, second, third, fourth and fifth transistors being conducting, the positive polarity still being on the first wire and this situation being maintained until the return of the negative polarity of the first wire, which has the effect of rendering nonconducting the fourth and fifth transistors, the collector of the eighth transistor also being connected through a diode to a capacitor, which becomes charged, the arrival of a positive polarity at the first wire rendering conducting the fourth and fifth transistors which, in becoming conducting, cause the discharge of the capacitor and a shift of the potentials at its electrodes, a positive voltage then rendering nonconducting the diode through which the base current of the seventh transistor was flowing, the latter being rendered nonconducting and thus rendering nonconducting the eighth transistor, the base of which no longer receives the ground potential, and when the call is connected by the members of the installation, the ground potential on the holding wire coming from the crossbar switch renders nonconducting the first, second, third, fourth and fifth transistors and causes the neon lamp to the continuously lit up.

10. The device according to claim 9, wherein in the case of a blocking in a permanent loop in which the first wire remains at the positive polarity although the call has been connected, but interruption of this positive polarity or of the transient negative polarities of spurious origin can occur and result in the fourth and fifth transistors becoming nonconducting, the capacitors are nevertheless not sufficiently charged, the first for delaying the return of the fifth transistor into the conducting state when the fourth transistor becomes conducting again and the second for applying a sufficient positive voltage to the base circuit of the seventh transistor to render it nonconducting, whereby the previously existing blocked state is not thereby modified and the neon lamp continues to flash.

* * * * *